(12) United States Patent
Vayssiere et al.

(10) Patent No.: US 10,717,513 B2
(45) Date of Patent: Jul. 21, 2020

(54) ROTARY WING AIRCRAFT WITH A SLIDING ELEMENT, IN PARTICULAR A SLIDING DOOR OR A SLIDING WINDOW

(71) Applicants: AIRBUS HELICOPTERS DEUTSCHLAND GMBH, Donauworth (DE); AIRBUS HELICOPTERS, Marignane (FR)

(72) Inventors: Aurelien Vayssiere, Niederschoenenfeld OT Feldheim (DE); Pierre Fruitet, Pompignan (FR); Fabrice Joussellin, Salon de Provence (FR); Robert Sienicki, Chelm (PL); Bartlomiej Tazbir, Lodz (PL); Michal Mroz, Lodz (PL); Bernhard Rein, Rain (DE)

(73) Assignees: Airbus Helicopters Deutschland GmbH, Donauworth (DE); Airbus Helicopters, Marignane (FR)

( * ) Notice: Subject to any disclaimer, the term of this patent is extended or adjusted under 35 U.S.C. 154(b) by 275 days.

(21) Appl. No.: 15/814,455

(22) Filed: Nov. 16, 2017

(65) Prior Publication Data
US 2018/0148157 A1 May 31, 2018

(30) Foreign Application Priority Data

Nov. 28, 2016 (EP) .................................. 16400054

(51) Int. Cl.
*B64C 1/14* (2006.01)
*E05D 15/10* (2006.01)
(Continued)

(52) U.S. Cl.
CPC .......... *B64C 1/1438* (2013.01); *B64C 1/1461* (2013.01); *B64C 27/04* (2013.01);
(Continued)

(58) Field of Classification Search
CPC ...... B64C 1/1438; B64C 1/1461; B64C 27/04
See application file for complete search history.

(56) References Cited

U.S. PATENT DOCUMENTS 3,585,757 A * 6/1971 Ritchie ................. B64C 1/1407
49/215
4,502,246 A 3/1985 Minami
(Continued)

FOREIGN PATENT DOCUMENTS

DE 29819083 U1 2/1999
EP 1788177 A1 5/2007
(Continued)

OTHER PUBLICATIONS

European Search Report for European Application No. EP 16400054, Completed by the European Patent Office, dated May 9, 2017, 6 pages.

*Primary Examiner* — Justin M Benedik
(74) *Attorney, Agent, or Firm* — Brooks Kushman P.C.

(57) ABSTRACT

A rotary wing aircraft with a fuselage that is equipped with at least one rail, comprising at least one sliding element, in particular a sliding door or a sliding window, that is slidably supported by the at least one rail, wherein the at least one sliding element is at least slidable along the at least one rail by means of an opening sliding movement into an opening movement direction from a fully closed position into a fully opened position, wherein a dampening unit is provided that dampens the opening sliding movement of the at least one sliding element upon reaching of the fully opened position.

20 Claims, 5 Drawing Sheets

(51) Int. Cl.
*B64C 27/04* (2006.01)
*E05F 5/00* (2017.01)

(52) U.S. Cl.
CPC ......... *E05D 15/10* (2013.01); *E05D 15/1042* (2013.01); *E05D 2015/1055* (2013.01); *E05F 5/003* (2013.01); *E05Y 2201/20* (2013.01); *E05Y 2201/22* (2013.01); *E05Y 2201/264* (2013.01); *E05Y 2201/408* (2013.01); *E05Y 2201/418* (2013.01); *E05Y 2201/424* (2013.01); *E05Y 2800/11* (2013.01); *E05Y 2900/502* (2013.01); *E05Y 2900/531* (2013.01)

(56) References Cited

U.S. PATENT DOCUMENTS

| | | | |
|---|---|---|---|
| 5,361,540 A | * | 11/1994 | Rogers, Jr. ............... E05D 13/04 |
| | | | 292/DIG. 46 |
| 5,967,595 A | * | 10/1999 | Heya ........................ B60J 5/06 |
| | | | 296/155 |
| 6,036,257 A | * | 3/2000 | Manuel ..................... B60J 5/06 |
| | | | 296/155 |
| 6,279,267 B1 | | 8/2001 | Barrett et al. |
| 6,328,374 B1 | | 12/2001 | Patel |
| 6,397,523 B1 | | 6/2002 | Fukumoto et al. |
| 6,430,875 B1 | | 8/2002 | Clark et al. |
| 2004/0172884 A1 | | 9/2004 | Engelgau et al. |
| 2007/0096504 A1 | | 5/2007 | Kothe et al. |
| 2007/0138813 A1 | | 6/2007 | Park |
| 2009/0230721 A1 | | 9/2009 | Rusnak |
| 2009/0267383 A1 | | 10/2009 | Fischer et al. |
| 2015/0183303 A1 | | 7/2015 | Choi et al. |

FOREIGN PATENT DOCUMENTS

| | | | |
|---|---|---|---|
| EP | 2112313 A1 | | 10/2009 |
| EP | 3061685 | * | 8/2016 |
| EP | 3061685 A1 | | 8/2016 |
| FR | 2772066 A1 | | 6/1999 |
| FR | 2809760 A1 | | 12/2001 |
| FR | 2896008 A1 | | 7/2007 |
| JP | 2000177391 A | | 6/2000 |
| JP | 2008240273 A | | 10/2008 |
| JP | 2010242406 A | | 10/2010 |
| JP | 2016060260 A | | 4/2016 |
| RU | 71959 U1 | | 3/2008 |
| WO | 2006025149 A1 | | 3/2006 |
| WO | 2008139298 A1 | | 11/2008 |

* cited by examiner

ROTARY WING AIRCRAFT WITH A SLIDING ELEMENT, IN PARTICULAR A SLIDING DOOR OR A SLIDING WINDOW

CROSS-REFERENCE TO RELATED APPLICATIONS

This application claims priority to European patent application No. EP 16400054.9 filed on Nov. 28, 2016, the disclosure of which is incorporated in its entirety by reference herein.

BACKGROUND OF THE INVENTION

(1) Field of the Invention

The present invention is related to a rotary wing aircraft with a fuselage that is equipped with at least one rail, comprising at least one sliding element, in particular a sliding door or a sliding window, that is slidably supported by the at least one rail, wherein the at least one sliding element is at least slidable along the at least one rail by means of an opening sliding movement into an opening movement direction from a fully closed position into a fully opened position.

(2) Description of Related Art

Sliding elements in a rotary wing aircraft, such as sliding doors or sliding windows, which are used to open or close corresponding apertures provided in the rotary wing aircraft, are usually guided on the rotary wing aircraft via suitable guide rails at a predetermined distance along an outer surface of the rotary wing aircraft up to a height of a corresponding aperture provided in the rotary wing aircraft, and are then guided into the aperture via suitably curved or bent ends of the guide rails. In general, such sliding elements must be moved manually from a corresponding fully opened position along the guide rails and must furthermore be locked manually in a corresponding fully closed position in the aperture of the rotary wing aircraft.

Conventional sliding elements usually comprise one or more sliding arm assemblies that are rigidly mounted to a plate-shaped support of the sliding element via an associated mounting plate by means of suitable fasteners, such as screws. If, for instance, the sliding element implements a sliding door, the one or more sliding arm assemblies are e.g. rigidly mounted to a door leaf of this sliding door.

Each one of the one or more sliding arm assemblies supports one or more roller carriages with associated guide rollers that are adapted for rolling along a given guide rail in operation. The one or more roller carriages, i.e. the associated guide rollers, are adapted for engaging the given guide rail in an accommodation provided on or in the given guide rail.

In particular, in rotary wing aircrafts sliding elements, such as sliding doors or sliding windows, are subject to very high aerodynamic forces during flight, which can lead to a loss of the sliding elements during flight, e.g. in case of a failure, such as a rupture of the one or more sliding arm assemblies thereof. However, it is clear that for safety reasons and according to applicable regulations, such as the EASA regulations, it is imperatively necessary to keep the sliding element on the rotary wing aircraft under all circumstances, i.e. also in case of failure respectively rupture of the one or more sliding arm assemblies thereof during flight.

Therefore, comparatively heavy sliding arm assemblies for sliding elements in rotary wing aircrafts have been developed to resist and to match with all flight conditions. Likewise, an underlying sizing of each part of a given sliding arm assembly associated with a sliding element can be increased, such as e.g. an underlying dimension of guide rollers of a roller carriage or an underlying dimension of a roller carriage attachment unit that connects the roller carriage to an associated base plate of the sliding arm assembly etc. In both cases, an over-dimensioning of the sliding arm assembly as a whole arises.

However, due to such an over-dimensioning of each part and, consequently, of the sliding arm assembly as a whole, a resulting overall weight of the given sliding arm assembly is significantly increased compared to a conventional sliding arm assembly. Furthermore, in term of costs correspondingly required machining elements are very expensive with conventional solutions/configurations.

Nevertheless, while such an over-dimensioning of each part contributes to an overall safety and reliability of the sliding arm assemblies such that they resist and match with all flight conditions, an important issue concerning normal use of respective sliding elements, such as sliding doors or sliding windows in rotary wing aircrafts, still needs to be resolved. More specifically, during normal use of a given sliding element, e.g. a sliding door in a rotary wing aircraft, the latter is frequently moved between a fully closed position and a fully opened position by means of respective opening/closing movements. Usually, upon reaching the fully opened position or the fully closed position, the sliding door strikes against an associated door frame. Such strikes, however, exert comparatively high forces on the at least one sliding arm assembly and, thus, the sliding door, which lead to a significant impact on rotary wing aircraft passenger comfort and sliding door durability.

In order to avoid such strikes, the respective opening/closing movements of the sliding doors can be decelerated upon reaching of the fully opened position and/or the fully closed position, if these respective opening/closing movements are realized by means of an electrical power steering mechanism. Nevertheless, such a mechanism is usually complex and requires a dedicated electrical motor for operation, which has a significant influence on weight and reliability. Furthermore, such an electrical power steering mechanism is comparatively expensive and requires maintenance in order to guarantee a failure-free functioning during lifetime.

If, however, manual movement of the sliding doors is envisaged as described above, the respective opening/closing movements of the sliding doors can at least be attenuated by means of suitable attenuation mechanisms. Corresponding attenuation mechanisms are e.g. known from the automobile industry but at least essentially used for attenuating closing movements of sliding doors in automobiles. However, such attenuation mechanisms that are used with automobile sliding doors are usually either very complex and/or not suitable for use with rotary wing aircrafts due to high temperature and pressure fluctuations that take place during operation of such rotary wing aircrafts.

It should further be noted that simple dampers are also known, such as e.g. described in the document WO 2008/0139298 A1, which are used with sliding doors in house and office areas. However, such simple dampers are merely used for dampening respective closing movements of the sliding doors, but not for dampening respective opening movements thereof. Furthermore, such dampers are not useable in aerospace constructions, i.e. with rotary wing aircrafts, due to the high temperature and pressure fluctuations that take place during operation of such rotary wing aircrafts. Moreover, a respectively required damper position's adjustment, if a given sliding door is equipped with a damper, would have to be made after its installation, which is difficult because of its accessibility, and also requires additional adjustment time, which makes its use time and cost expensive.

Still another problem that arises with sliding elements, such as sliding doors or sliding windows in rotary wing aircrafts, is that e.g. a given sliding door may unintentionally and inadvertently move from the fully opened position in direction of the fully closed position if it is not suitably retained in the fully opened position. This may lead to harm and injury of e.g. a respective operator of the sliding door or rotary wing aircraft passengers. Therefore, it is necessary to provide a blocking and retaining mechanism for blocking and retaining the given sliding door in the fully opened position upon reaching of the fully opened position.

The document EP3061685 describes a helicopter that comprises a fuselage. The fuselage comprises at least two longitudinal side walls, a board side wall and a starboard side wall. One side wall is provided with a sliding closing element region, wherein a sliding closing element arrangement with a sliding door, one upper and one lower rail arrangement are arranged. The upper and lower rail arrangements are attached to the fuselage. A bar-shaped connector beam has one of its axial ends connected to a guide roller mount via an upper and a lower coupling plate. A L-shaped mounting component is arranged on a door leaf of the sliding door such that the mounting plate abuts against an inner surface of the door leaf, while the mounting plate abuts against an inner attachment ledge provided on the door leaf.

The U.S. Pat. No. 5,361,540 describes a road vehicle of the van type. The van has a sliding vehicle door. To prevent rearward travel of the door is provided a bumper that then engages an arm. A mounting plate also has a flange member which projects generally downwardly and which is surrounded by an elastomeric bumper.

The U.S. Pat. No. 6,036,257 describes another road-vehicle such as a passenger van having a rear side door mounted on rollers that run in tracks. A latch is engaged when the door reaches the fully open position to hold door in this position. A rubber block is affixed a support arm of the rear side door. An elastomeric block overhangs a support 56 so that this elastomeric block acts as a bumper stop when side door is fully opened.

The document FR2896008 describes a road vehicle with a sliding rail integrated to a shell of the vehicle. A stop is rigidly attached to the vehicle opposes a displacement of a door sliding element along a displacement direction defined by a rail. The stop includes two convergent faces giving the stop a V shape to immobilize the sliding element by a corner effect.

The document FR2809760 describes a friction damper used to arrest sliding door for a road vehicle. The friction damper comprises a casing containing a steel plate deflecting progressively against a corner shaped resilient elastomer as a door finger advances.

Respective blocking and retaining mechanisms for sliding doors in general are already well-known. For instance, the document US 2007/0138813 A1 describes a hold-open lock mechanism of a sliding door of a vehicle in general. This sliding door is provided with an inner handle that, if manipulated, operates a hold-open lock that retains the sliding door in its fully opened position so that even if the sliding door is opened on a slope, the sliding door maintains a locked-open state.

The above described mechanisms and systems as well as exemplary sliding elements in vehicles in general are more or less described in various documents. Exemplary documents are the documents DE 298 19 083 U1, EP 2 112 313 A1, EP 1 788 177 A1, FR 2 772 066 A1, JP 2016-060260 A, JP 2010-242406 A, JP 2008-240273 A, JP 2000-177391 A, RU 71959 U1, US 2015/0183303 A1, US 2009/0267383 A1, US 2009/0230721 A1, US 2007/0096504 A1, US 2004/0172884 A1, U.S. Pat. No. 6,430,875 B1, U.S. Pat. No. 6,328,374 B1, U.S. Pat. No. 6,279,267 B1, U.S. Pat. No. 4,502,246 A and WO 2006/025149 A1.

In summary, rotary wing aircrafts and, in particular, sliding elements thereof, are currently not provided with any means that allow for a mechanical attenuation of strikes of the sliding elements against respective accommodation frames upon reaching fully opened positions during opening sliding movements. As already mentioned above, this leads to a significant impact on rotary wing aircraft passenger comfort and sliding element durability.

BRIEF SUMMARY OF THE INVENTION

It is, therefore, an object of the present invention to provide a new rotary wing aircraft with a sliding element that is adapted to increase rotary wing aircraft passenger comfort and that is adapted to provide for an increased durability. This object is solved by a rotary wing aircraft having the features of claim 1.

More specifically, according to the present invention a rotary wing aircraft with a fuselage that is equipped with at least one rail comprises at least one sliding element, in particular a sliding door or a sliding window, that is slidably supported by the at least one rail. The at least one sliding element is at least slidable along the at least one rail by means of an opening sliding movement into an opening movement direction from a fully closed position into a fully opened position. A dampening unit is provided that dampens the opening sliding movement of the at least one sliding element upon reaching of the fully opened position.

Advantageously, the dampening unit allows at least to dampen strikes of the sliding element against the fuselage, i.e. a respective accommodation frame, upon reaching the fully opened position during an associated opening movement. More specifically, the dampening unit preferably provides for a smooth damping at low speed and a hard damping at high speed of the sliding element during an associated opening sliding movement upon reaching the fully opened position. Thus, a quiet and comfortable sliding element movement stop upon reaching of the fully opened position can easily be obtained.

In particular, provision of such a dampening unit advantageously prevents the so-called ultime load on the sliding element, resp. the at least one associated sliding arm assembly. The ultime load represents an exceptional flight and ground load during operation of the sliding element, such as e.g. braking of a rotary wing aircraft that is equipped with the sliding element during roll-out of the rotary wing aircraft on ground, as well as an associated deceleration of the sliding element. Preferably, the dampening unit works at least in a temperature range from −45° C. to +85° C.

According to one aspect, the dampening unit exhibits a construction that is designed to minimize a respective installation and/or replacement time. Advantageously, the dampening unit is ready to work just after its installation, i.e.

mounting, to the rotary wing aircraft without any particular adjustment requirement. Preferably, any required adjustment of the dampening unit is performed before its installation, i.e. mounting to the rotary wing aircraft, which significantly decreases the above-mentioned respective installation and/ or replacement time.

According to a preferred embodiment of the invention, the dampening unit is mounted to the fuselage.

According to a further preferred embodiment of the invention, the dampening unit is accommodated within an associated housing, the housing being releasably mounted to the fuselage by means of associated fixation members.

Advantageously, the sliding element can easily be removed from the rotary wing aircraft after removal of the associated housing from the fuselage, i.e. a bottom part of the rotary wing aircraft. Therefore, the associated housing is preferably mounted in a releasable manner to the rotary wing aircraft, i.e. the fuselage. In particular, provision of the releasably mounted housing for a releasable accommodation of the dampening unit allows for an extremely short replacement time required for replacement of the dampening unit.

According to a further preferred embodiment of the invention, the dampening unit comprises a dampening member with a visco-elastic behavior, the dampening member comprising a moveable piston.

According to a further preferred embodiment of the invention, at least one sliding arm assembly is mounted to the at least one sliding element for slidably connecting the at least one sliding element to the at least one rail. The at least one sliding arm assembly comprises a piston pusher that pushes the moveable piston upon reaching of the fully opened position of the at least one sliding element against a load that is applied to the moveable piston by means of the dampening member.

According to a further preferred embodiment of the invention, the at least one sliding arm assembly comprises a retaining hook that, upon reaching of the fully opened position of the at least one sliding element, retains the at least one sliding element in the fully opened position such that the load that is applied to the moveable piston by means of the dampening member, which pushes the moveable piston into a closing movement direction of the at least one sliding element, is prevented from pushing the at least one sliding element into the closing movement direction.

According to a further preferred embodiment of the invention, the retaining hook is moveable, preferably axially moveable, and loaded by means of an associated spring member into a retaining position.

According to a further preferred embodiment of the invention, the dampening unit comprises a retaining hook counterpart that blocks the retaining hook in its retaining position upon reaching of the fully opened position of the at least one sliding element.

Advantageously, the dampening unit is part of a sliding element locking and retaining system, which preferably performs a locking and retaining function for locking and retaining the sliding element in the fully opened position. Thus, locking and retaining of the sliding element in the fully opened position can easily be obtained.

More specifically, the locking and retaining function increases a respective safety of rotary wing aircraft passengers and/or operators, as it advantageously prevents an unexpected sliding element closure, e.g. when the rotary wing aircraft stays at sloping terrain or during maneuvering. Furthermore, the locking and retaining system ensures support of the sliding element during roller carriage failure, when the sliding element is in fully opened position.

Preferably, the rotary wing aircraft is provided with a mechanical stopper. According to one aspect, the mechanical stopper is provided at the fuselage, i.e. a respective accommodation frame of the sliding element, preferably at the associated housing of the dampening unit. In this case, when the dampening unit is damaged or otherwise out of service, the mechanical stopper and, thus, the associated housing, may block the sliding element at the end of the rail.

According to a further preferred embodiment of the invention, a manually operable activating mechanism is provided for movement of the retaining hook from the retaining position into a releasing position in order to release the retaining hook prior to sliding the at least one sliding element along the at least one rail by means of the closing sliding movement into the closing movement direction from the fully opened position into the fully closed position.

According to a further preferred embodiment of the invention, the dampening member is a mechanical, pneumatical and/or hydraulic damper.

According to a further preferred embodiment of the invention, the at least one sliding arm assembly comprises a roller carriage.

According to a further preferred embodiment of the invention, the roller carriage is attached to the at least one sliding arm assembly by means of an associated attachment unit.

According to a further preferred embodiment of the invention, the roller carriage comprises at least one guide roller that is arranged in the at least one rail for rolling in the at least one rail during the opening sliding movement of the at least one sliding element into the opening movement direction.

According to a further preferred embodiment of the invention, the at least one sliding arm assembly comprises a guide finger that is arranged in the at least one rail for guiding the at least one sliding element on the at least one rail, at least in case of a failure of the roller carriage.

Advantageously, provision of the guide finger provides for additional safety in case of a guide roller or roller carriage failure, or in case of a failure of the dampening unit.

According to a further preferred embodiment of the invention, the dampening unit dampens the opening sliding movement of the at least one sliding element starting at most 12 mm prior to reaching of the fully opened position of the at least one sliding element.

Advantageously, the sliding element with the above described features is easier to maintain, increases safety and represents a gain in usage comfort. The combination of all these advantages is obtained though one single mechanism, i.e. the dampening unit according to the present invention, which is moreover not complex. This single mechanism allows for a fast and easy sliding element dismounting from the fuselage of the rotary wing aircraft.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
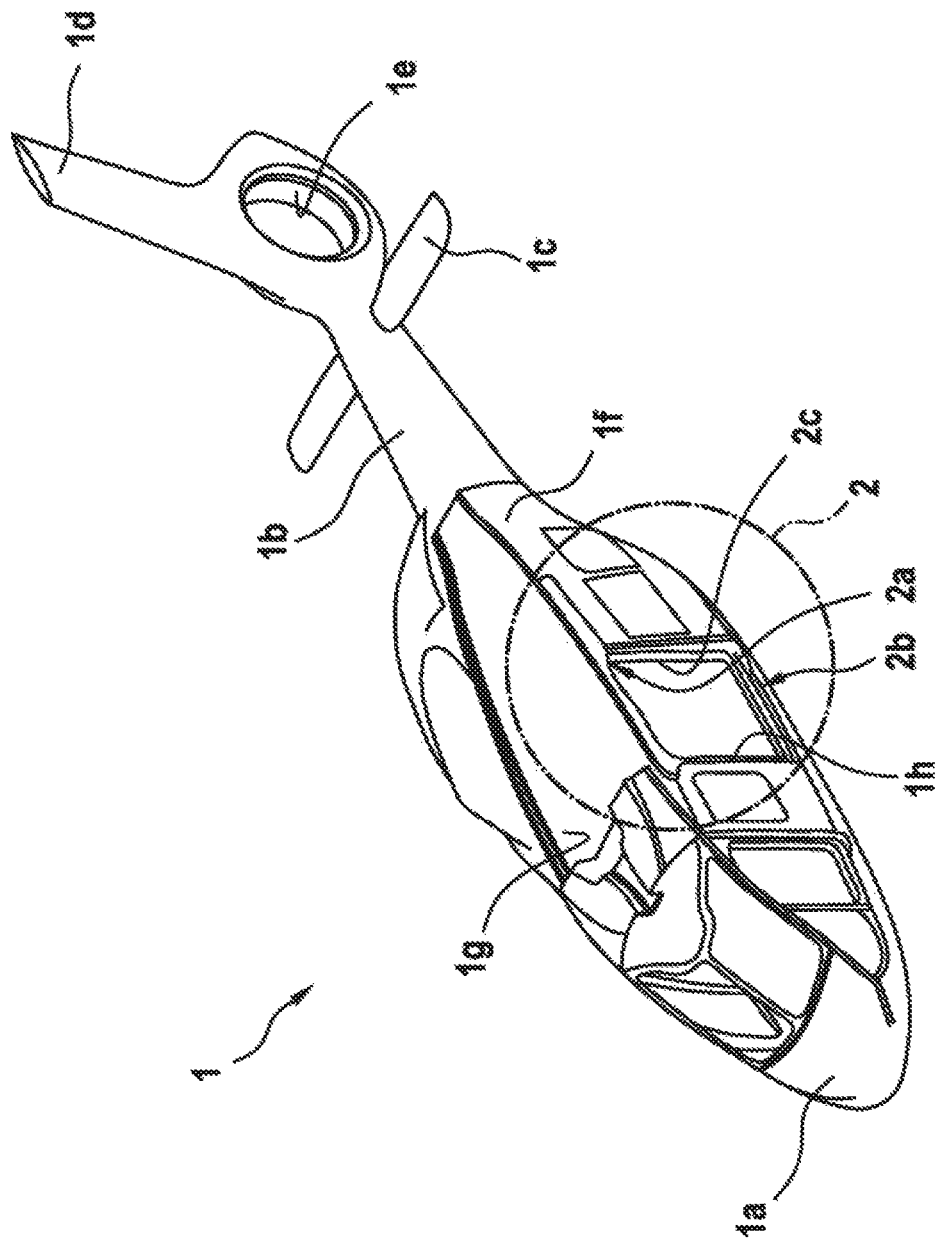
FIG. 1 shows a schematic view of a vehicle that is adapted to receive a sliding element according to the present invention.

FIG. 1 shows a vehicle 1 that is exemplarily illustrated as an aircraft, in particular as a rotary wing aircraft and, more particularly, as a helicopter. Thus, for purposes of simplicity and clarity, the vehicle 1 is hereinafter referred to as the "rotary wing aircraft 1". The present invention is, however, not limited to rotary wing aircrafts and can likewise be applied to any other vehicle, in particular to a vehicle that is controllable in a flowing medium, such as air or water, independent of a particular configuration thereof.

Illustratively, the rotary wing aircraft 1 comprises a fuselage 1a that defines a tail boom 1b, which exemplarily comprises a tail wing 1c, a fin 1d and a shroud 1e for accommodation of a suitable counter-torque device, such as a tail rotor, which is configured to provide counter-torque during operation in order to balance the rotary wing aircraft 1 in terms of yaw. The tail boom 1b may further be provided e.g. with a horizontal stabilizer, a bumper and so on.

It should be noted that only the fuselage 1a with the tail boom 1b are shown in FIG. 1 for purposes of simplicity and clarity of the drawings. However, other conventional components, such as e.g. a main rotor and a landing gear of the rotary wing aircraft 1, are not shown, as they are well-known to the person skilled in the art and not part of the present invention and would, thus, only unnecessarily encumber and complicate the representation.

Illustratively, the fuselage 1a comprises at least two longitudinal side walls, a board side wall 1f and a starboard side wall 1g, both of which are preferably connected to the tail boom 1b. The fuselage 1a preferably defines at least a cockpit, a passenger cabin and/or a cargo compartment. However, for simplicity and clarity of the description, such a cockpit, passenger cabin and cargo compartment are not explained in greater detail.

According to one aspect of the present invention, at least the board side wall 1f is provided with a sliding element region 2, wherein a sliding element arrangement (3 in FIG. 2) with at least one upper and at least one lower rail arrangement 2a, 2b can be provided. Illustratively, the upper and lower rail arrangements 2a, 2b are attached to the fuselage 1a.

More specifically, the upper and lower rail arrangements 2a, 2b are preferably adapted for slidably receiving a sliding element, in particular a sliding door (4 in FIG. 2) or a sliding window, which in turn is adapted for opening or closing an aperture 1h provided in the sliding element region 2 of the board side wall 1f, preferably sealingly. By way of example, the aperture 1h is equipped with a frame 2c.

According to one aspect of the present invention, the starboard side wall 1g is also provided with a sliding element region 2, wherein at least one upper and at least one lower rail arrangements 2a, 2b are attached to the fuselage 1a and wherein an aperture 1h is provided for reception of a sliding element. More specifically, the starboard side wall 1g is preferably provided with a sliding element arrangement that is preferably embodied similar to the sliding element arrangement 3 of FIG. 2.

Figure 2:
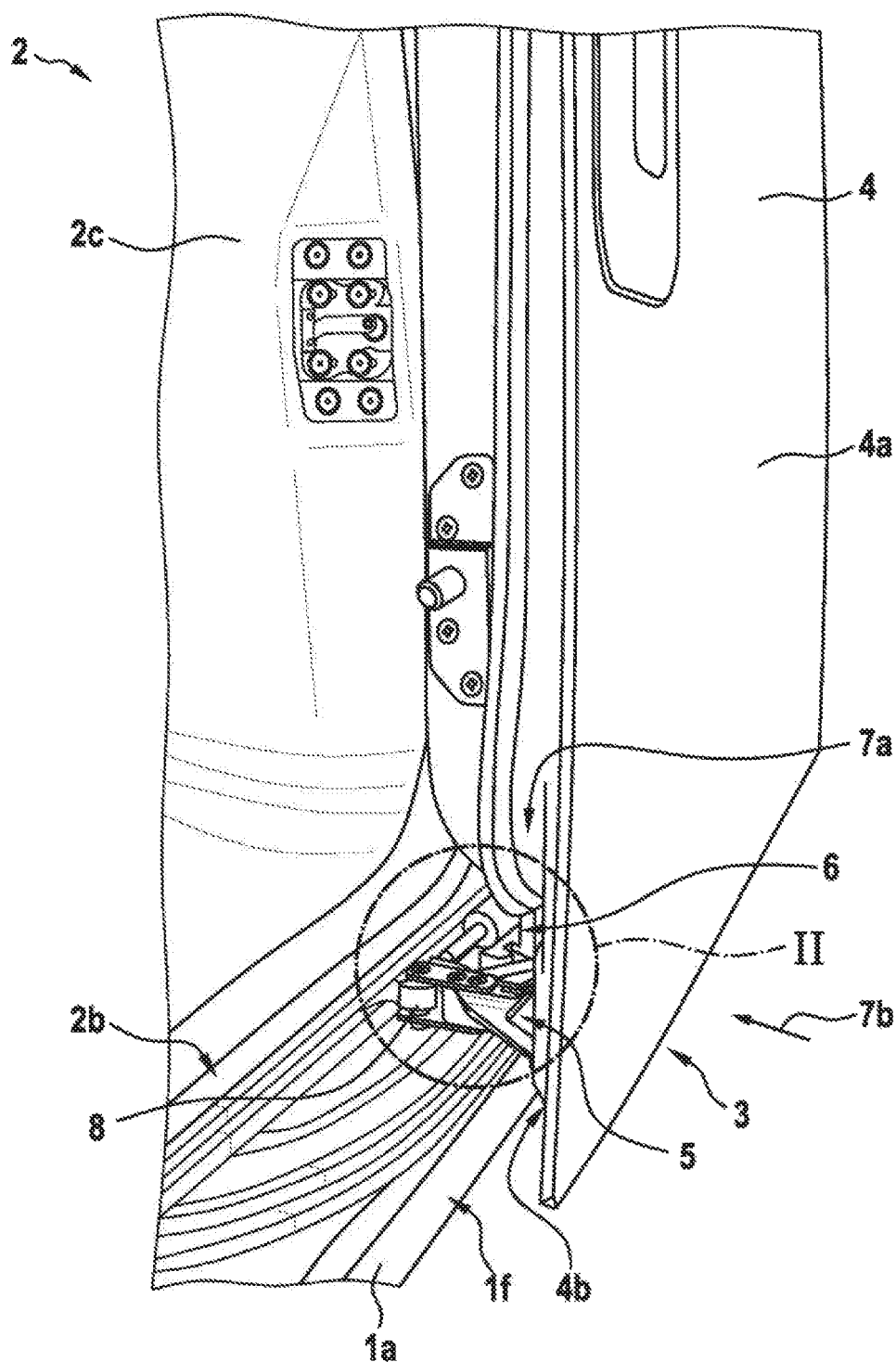
FIG. 2 shows a perspective view of a sliding element arrangement with the sliding element of FIG. 1, a lower rail, a sliding arm assembly and a dampening unit according to the present invention.

FIG. 2 shows a sliding element arrangement 3 according to the present invention, which is exemplarily adapted for being mounted at the sliding element region 2 of FIG. 1 to the board side wall 1f of the fuselage 1a of the rotary wing aircraft 1 of FIG. 1. Illustratively, the sliding element arrangement 3 is mounted to the frame 2c of the fuselage 1a, which is provided at the sliding element region 2.

The sliding element arrangement 3 preferably comprises at least one sliding element 4, in particular a sliding door or a sliding window, as well as the upper and lower rail arrangements 2a, 2b of FIG. 1, which are preferentially attached to the board side wall 1f of the rotary wing aircraft 1 of FIG. 1 by means of suitable fasteners, such as screws, bolts, rivets and so on. However, for simplicity and clarity of the drawings, only a section of the lower rail arrangement 2b is illustrated and the suitable fasteners are not visible. Therefore, for simplicity and brevity, the lower rail arrangement 2b is also referred to hereinafter as the "rail 2b".

The sliding element 4 is illustratively embodied as a sliding door and, therefore, also referred to hereinafter as the "sliding door 4", for simplicity and clarity. Consequently, the frame 2c defines a sliding door frame.

The sliding door 4 is preferably slidably supported by the rail 2b such that the sliding door 4 may slide along the rail 2b in operation. More specifically, the sliding element 4 is preferably at least slidable along the rail 2b by means of an opening sliding movement into an opening movement direction from a fully closed position into a fully opened position. The fully opened position is exemplarily illustrated in FIG. 1.

Illustratively, the sliding door 4 comprises at least a door leaf 4a and at least one sliding arm assembly 5 that is rigidly mounted to the door leaf 4a by means of suitable fasteners, such as screws, bolts, rivets and so on. Preferably, the sliding arm assembly 5 is mounted to a lower edge 4b of the door leaf 4a, i.e. in the region of the lower edge 4b.

The sliding arm assembly 5 is preferably provided with, i.e. connected to, a roller carriage 8. The roller carriage 8 preferentially enables at least sliding of the sliding element 4 along the rail 2b by means of the opening sliding movement into the opening movement direction from the fully closed position into the fully opened position. Therefore, the roller carriage 8 is preferably equipped with one or more guide rollers (8a in FIG. 8) that are guided within the rail 2b and provided for rolling in the rail 2b during the opening sliding movement.

According to one aspect, a dampening unit 6 is provided that dampens the opening sliding movement of the sliding door 4 upon reaching of the fully opened position. The dampening unit 6 is preferably mounted to the fuselage 1a, preferentially in a releasable manner. Preferably, the dampening unit 6 works at least in a temperature range from −45° C. to +85° C.

Illustratively, a section of the sliding element arrangement 3 is labelled with the reference sign II. Furthermore, a top viewing direction from above the sliding element arrangement 3 is labelled with the reference sign 7a and a side viewing direction thereof is labelled with the reference sign 7b.

Figure 3:
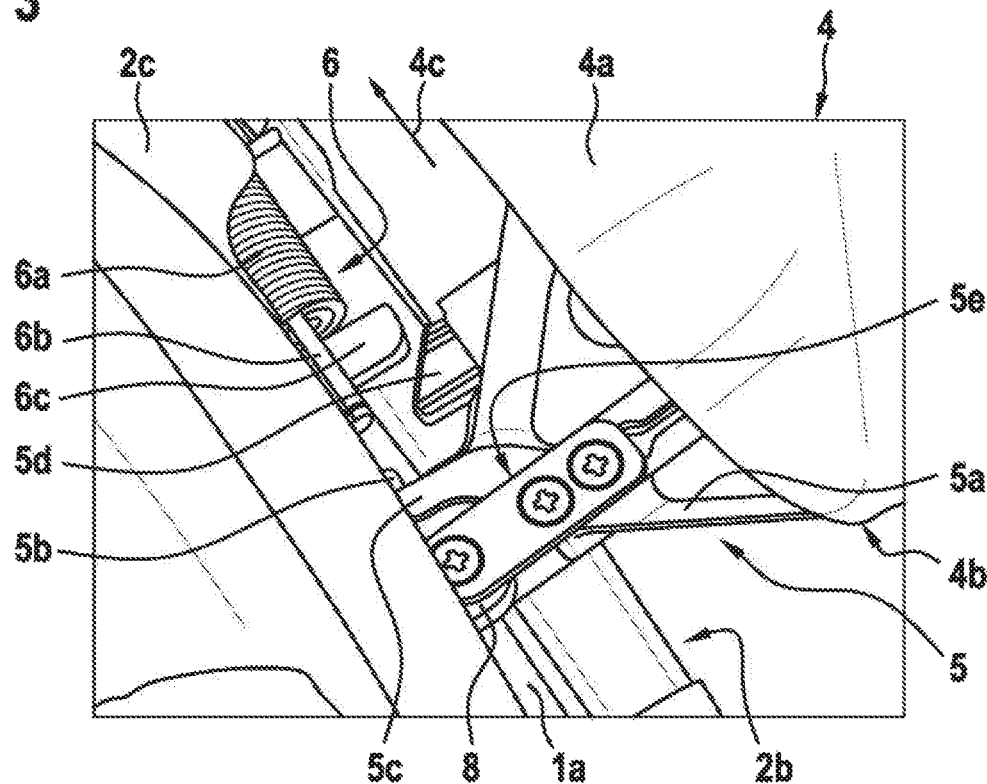
FIG. 3 shows a top view of a detail II of FIG. 2 with the lower rail, the sliding arm assembly and the dampening unit of FIG. 2 during a first opening phase of the sliding element of FIG. 2.

FIG. 3 shows the detail II of FIG. 2 seen in the top viewing direction 7a of FIG. 2 for further illustrating the dampening unit 6 of FIG. 2. Moreover, the sliding door 4 with the door leaf 4a, the sliding arm assembly 5 and the roller carriage 8 is further illustrated during sliding of the sliding door 4 along the rail 2b of FIG. 2, which is mounted at the sliding door frame 2c of FIG. 2 to the fuselage 1a of FIG. 2, by means of an opening sliding movement into an opening movement direction 4c towards the fully opened position.

According to one aspect, the dampening unit 6 is equipped with a dampening member 6a that preferably exhibits a visco-elastic behavior. A damping effect that is obtained with the dampening member 6a is preferably proportional to a respective speed impact created by the sliding arm assembly 5 on the dampening unit 6.

The dampening member 6a is preferentially implemented as a mechanical, pneumatical and/or hydraulic damper, and provided with a moveable piston 6b. The latter is preferably loaded by the dampening member 6a in a direction that is opposed to the opening movement direction 4c and that, accordingly, corresponds to a closing movement direction (4d in FIG. 5) of the sliding door 4.

Preferably, a retaining hook counterpart 6c is associated with the dampening unit 6. This retaining hook counterpart 6c is preferentially at least provided for blocking and retaining the sliding door 4 in the fully opened position, as described in more detail below.

According to one aspect, the sliding arm assembly 5 is provided with a plate-shaped base component 5a, which is also referred to hereinafter as the "base plate 5a". The base plate 5a is preferably rigidly mounted to the door leaf 4a, preferentially at the lower edge 4b of the door leaf 4a, by means of suitable fasteners, such as screws, bolts, rivets and so on. Furthermore, the base plate 5a is preferably connected to the roller carriage 8, which is exemplarily attached to the sliding arm assembly 5 and, more specifically, to the base plate 5a by means of an associated attachment unit 5e.

Preferentially, the base plate 5a is further provided with at least one guide finger 5b that is slidingly, i.e. glidingly, received resp. arranged in the rail 2b for guiding the sliding door 4 on the rail 2b, at least in case of a failure of the roller carriage 8, as well as with at least one piston pusher 5c for interaction with the dampening unit 6. Preferably, the base plate 5a, the at least one guide finger 5b and the at least one piston pusher 5c are embodied as an integral, one-piece component. However, alternatively the at least one guide finger 5b and the at least one piston pusher 5c can be attached to the base plate 5a by any suitable means, such as screws, bolts, rivets, bonding, welding and so on.

Figure 5:
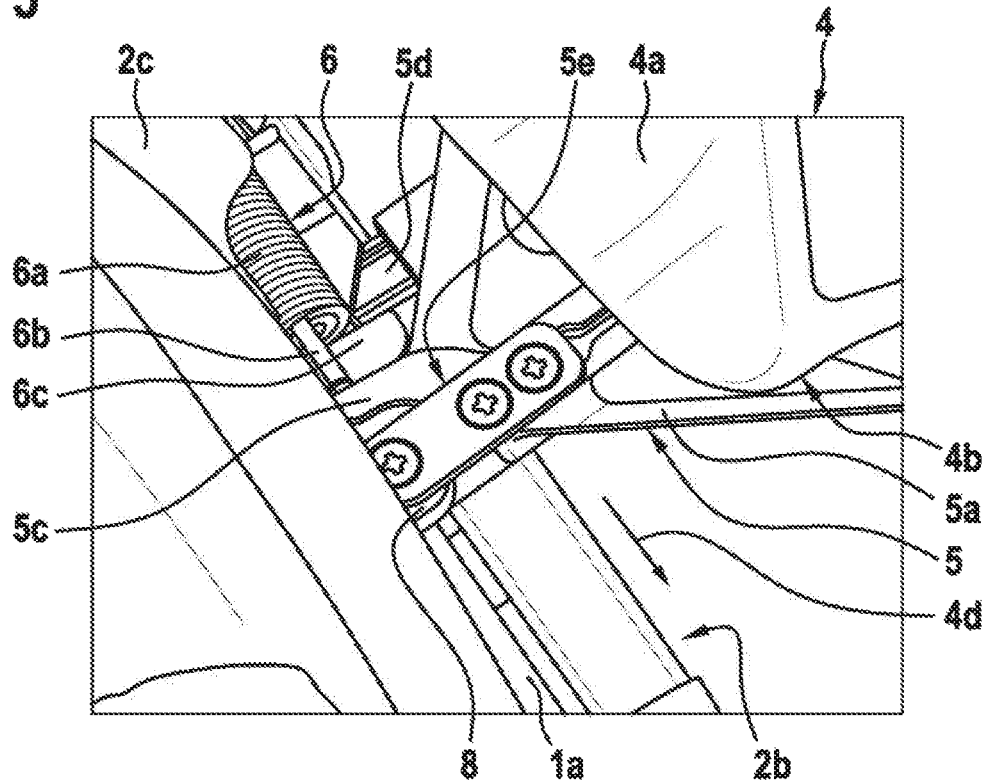
FIG. 5 shows a top view of the detail II of FIG. 2 with the lower rail, the sliding arm assembly and the dampening unit of FIG. 2 upon reaching of the fully opened position of the sliding element of FIG. 2.

According to one aspect, the sliding arm assembly 5 is further equipped with at least one retaining hook 5d that, upon reaching of the fully opened position of the sliding door 4, retains the sliding door 4 in the fully opened position, as illustrated in FIG. 5. Preferably, the at least one retaining hook 5d is implemented as a slider and activatable, i.e. retractable. More specifically, the retaining hook 5d is moveable, preferentially axially moveable, and loaded by means of an associated spring member (10b in FIG. 8) into a retaining position that corresponds to a normal standby position of the retaining hook 5d, which is illustrated in FIG. 3.

Figure 4:
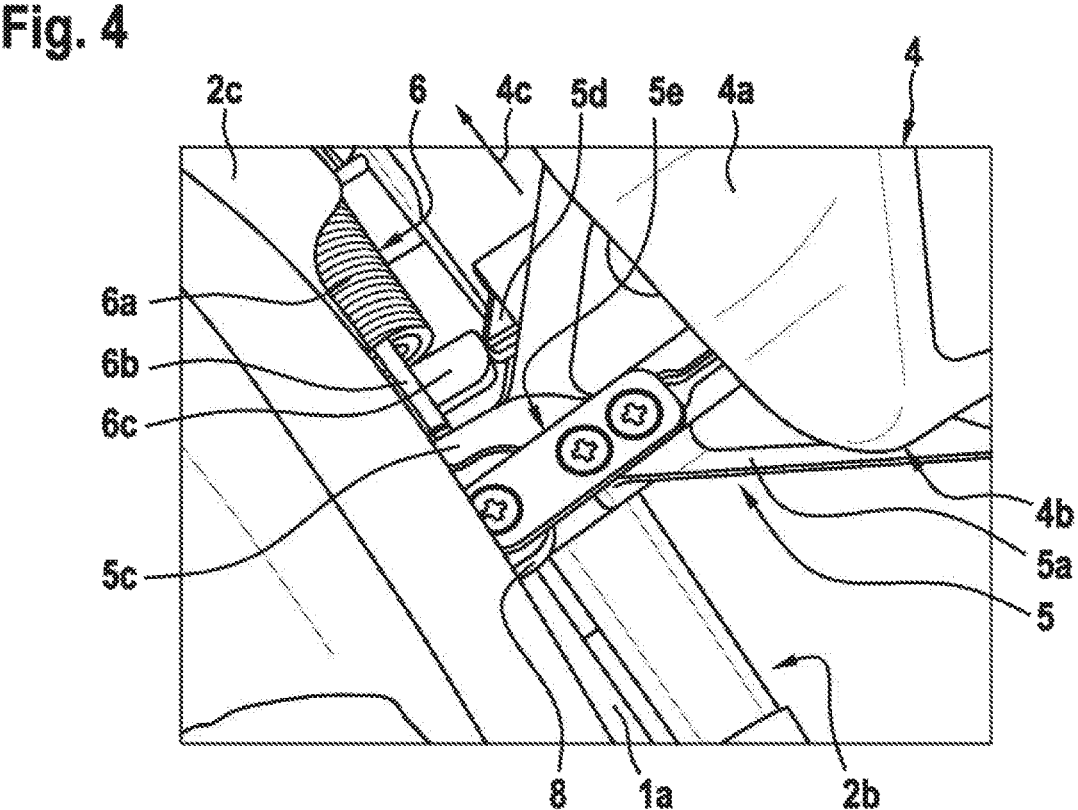
FIG. 4 shows a top view of the detail II of FIG. 2 with the lower rail, the sliding arm assembly and the dampening unit of FIG. 2 during a second opening phase of the sliding element of FIG. 2.

FIG. 4 shows the detail II of FIG. 2 seen in the top viewing direction 7a of FIG. 2 for further illustrating functioning of the dampening unit 6 of FIG. 2 and the sliding arm assembly 5 of FIG. 2 during the opening sliding movement of the sliding door 4 of FIG. 2 into the opening movement direction 4c towards the fully opened position. More specifically, in comparison to FIG. 3, the sliding door 4 with the sliding arm assembly 5 were further moved into the opening movement direction 4c such that in FIG. 4 exemplarily an illustrative intermediate sliding door position is reached.

In the intermediate sliding door position of FIG. 4, the piston pusher 5c of the sliding arm assembly 5 illustratively abuts against the moveable piston 6b of the dampening unit 6. Furthermore, the at least one retaining hook 5d of the sliding arm assembly 5 was pushed by the retaining hook counterpart 6c of the dampening unit 6 into a retracted position, preferably against the load of an associated spring member (10b in FIG. 8).

Preferably, pushing of the at least one retaining hook 5d from the retaining position of FIG. 3 into the retracted position of FIG. 4 is accomplished by means of a ramp provided on the at least one retaining hook 5d that glides along the retaining hook counterpart 6c during the opening sliding movement of the sliding door 4 of FIG. 2 into the opening movement direction 4c towards the fully opened position. However, such a functioning and suitable realizations thereof are well-known to the person skilled in the art and, therefore, not described in more detail, for brevity and conciseness.

FIG. 5 shows the detail II of FIG. 2 seen in the top viewing direction 7a of FIG. 2 for further illustrating functioning of the dampening unit 6 of FIG. 2 and the sliding arm assembly 5 of FIG. 2 during the opening sliding movement of the sliding door 4 of FIG. 2 into the opening movement direction 4c towards the fully opened position. More specifically, in comparison to FIG. 3, the sliding door 4 with the sliding arm assembly 5 were further moved into the opening movement direction 4c such that in FIG. 4 the sliding door 4 has reached the fully opened position.

During the opening sliding movement from the intermediate sliding door position of FIG. 4 into the fully opened position of FIG. 5, the piston pusher 5c of the sliding arm assembly 5 pushed the moveable piston 6b of the dampening unit 6—illustratively in the opening movement direction 4c of FIG. 4—against a load that is applied to the moveable piston 6b—illustratively into a closing movement direction 4d of the sliding door 4—by means of the dampening member 6a. Preferably, the piston pusher 5c is provided to transfer the energy from the sliding door 4 that emanates from the opening sliding movement to the dampening member 6a, where the energy is transformed into heat. Its second function is to support the roller carriage 8.

However, as the load that is applied to the moveable piston 6b of the dampening unit 6 by means of the dampening member 6a pushes the moveable piston 6b into the closing movement direction 4d of the sliding door 4, the opening sliding movement of the sliding door 4 upon reaching of the fully opened position is dampened. More specifically, the dampening unit 6 preferably dampens the opening sliding movement of the sliding door 4 starting at most 12 mm prior to reaching of the fully opened position of the sliding door 4.

Preferably, in the fully opened position the at least one retaining hook 5d is again in its retaining position. Thus, the at least one retaining hook 5d is preferentially retained at the retaining hook counterpart 6c that is associated with the dampening unit 6, which blocks and, thus, retains the at least one retaining hook 5d in the retaining position upon reaching of the fully opened position of the sliding door 4, as illustrated in FIG. 5. Consequently, the load that is applied to the moveable piston 6b of the dampening unit 6 by means of the dampening member 6a, which pushes the moveable piston 6b into the closing movement direction 4d of the sliding door 4, is prevented from pushing the sliding door 4 into the closing movement direction 4d. Furthermore, an undesired, unattended and inadvertent closure, in particular self-closure of the sliding door 4, can advantageously be prevented.

Again, it should be noted that functioning and suitable realizations of the at least one retaining hook 5d and the retaining hook counterpart 6c are well-known to the person skilled in the art and, therefore, not described in more detail, for brevity and conciseness.

According to one aspect, for closing the sliding door 4, the latter must be moved by means of a closing sliding movement into the closing movement direction 4d from the illustrated fully opened position into the fully closed position. For enabling such a closing sliding movement, the at least one retaining hook 5d must be released from the retaining hook counterpart 6c, as described below with reference to FIG. 8.

Figure 6:
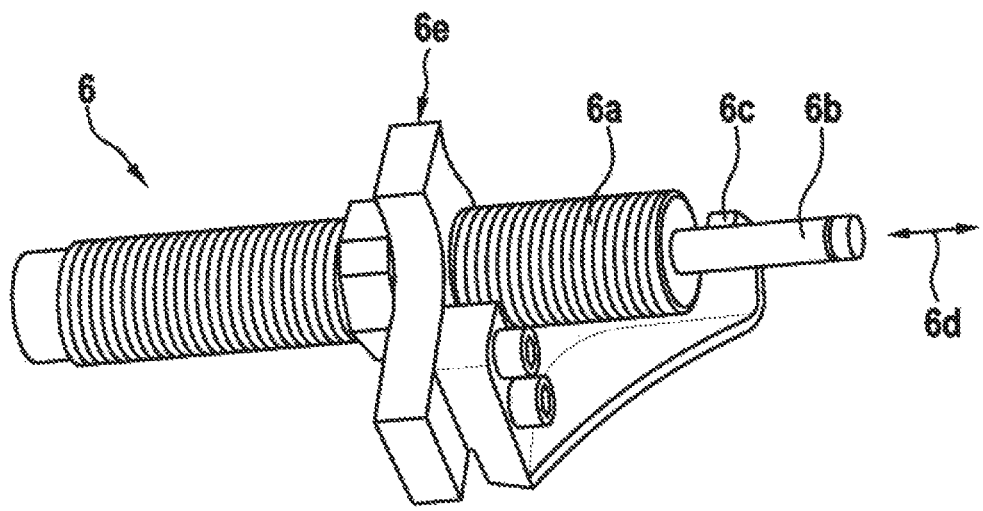
FIG. 6 shows a perspective view of the dampening unit of FIG. 2 to FIG. 5.

FIG. 6 shows the dampening unit 6 of the preceding figures, with the dampening member 6a, the moveable piston 6b and the associated retaining hook counterpart 6c. According to one aspect, the associated retaining hook counterpart 6c is rigidly mounted to a mounting flange unit 6e, e.g. by means of suitable fasteners, such as screws, bolts, rivets and so on. Alternatively, the associated retaining hook counterpart 6c and the mounting flange unit 6e can be embodied as a single, integral component.

Preferably, the mounting flange 6e accommodates and retains the dampening member 6a, e.g. by means of a threaded connection. The latter advantageously allows adjustment of the dampening unit 6 prior to mounting to the rotary wing aircraft 1 of FIG. 1. The threaded connection may be secured by means of a counternut, as illustrated.

FIG. 6 further illustrates exemplary movement directions 6d of the moveable piston 6b. Preferably, these movement directions 6d are coaxially arranged with respect to a longitudinal extension of the moveable piston 6b.

Figure 7:
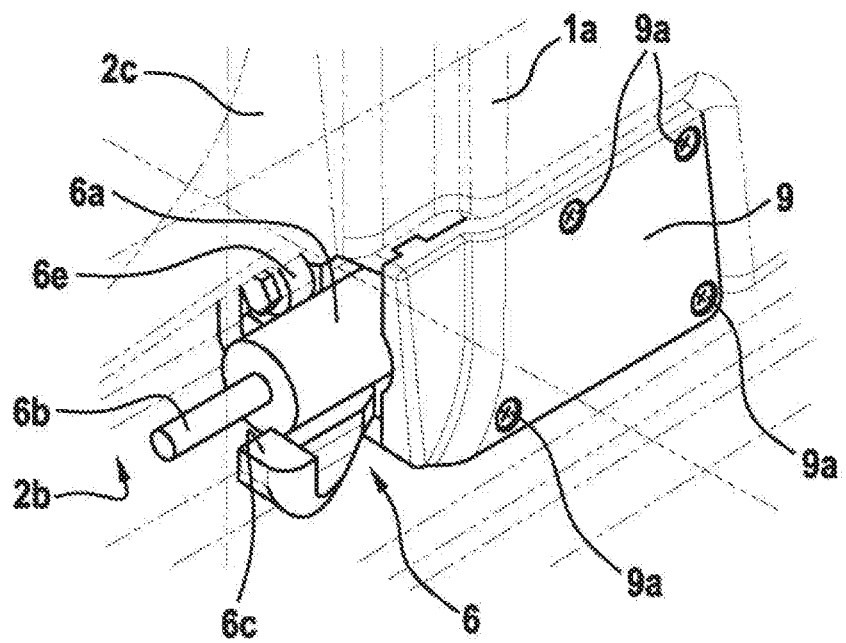
FIG. 7 shows a perspective view of the dampening unit of FIG. 2 to FIG. 6 that is mounted to an associated housing.

FIG. 7 shows the dampening unit 6 of FIG. 6 according to the present invention, which is exemplarily mounted to the frame 2c of the fuselage 1a of the rotary wing aircraft 1 of FIG. 1, seen in the side viewing direction 7b of FIG. 2. However, for simplicity and clarity of the drawings, illustration of the sliding door 4 and the sliding arm assembly 5 of the preceding figures was omitted.

Illustratively, the dampening unit 6 is accommodated within an associated housing 9. According to one aspect, the housing 9 is releasably mounted to the fuselage 1a by means of associated fixation members 9a, such as screw or bolts. Exemplarily, four bolts are used. The housing 9 can be a single piece, which is e.g. U-shaped and retains the mounting flange 6e of the dampening unit 6 at the fuselage 1a. Alternatively, the housing 9 may consist of a receptacle and a cover, as illustrated. However, other implementations are likewise possible and contemplated.

Figure 8:
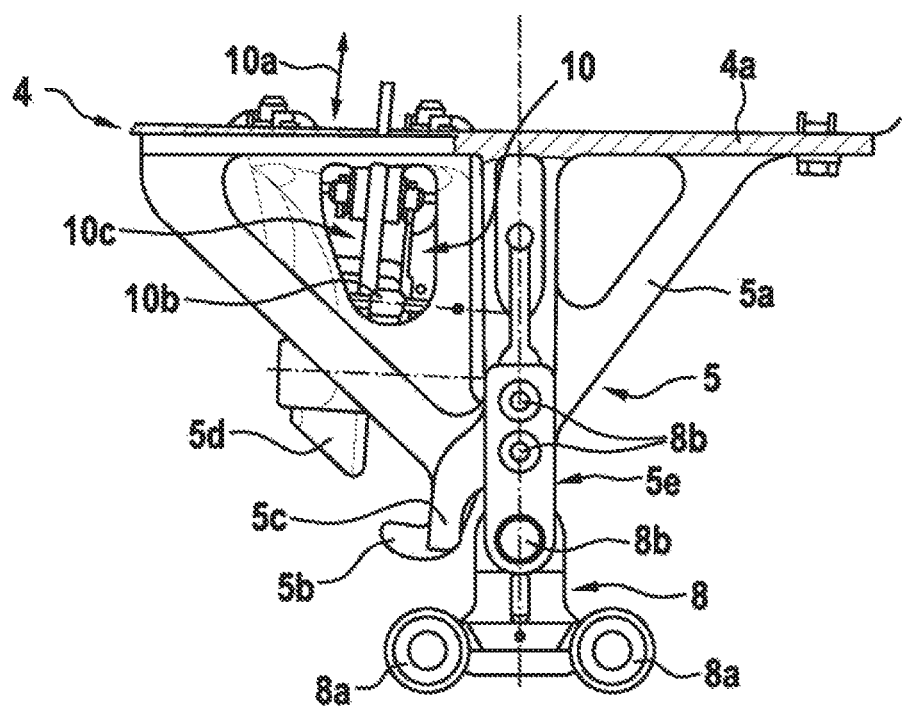
FIG. 8 shows a top view of the sliding arm assembly of FIG. 2 to FIG. 5 with a retaining hook activating mechanism.

FIG. 8 shows the sliding door 4 with the sliding arm assembly 5 of FIG. 1 to FIG. 5, seen in the top viewing direction 7a of FIG. 2, for further illustrating an exemplary realization of the sliding arm assembly 5 with the guide finger 5b and the piston pusher 5c. As described above, the sliding arm assembly 5 is preferably provided with the roller carriage 8 of FIG. 3 to FIG. 5, which preferentially comprises at least one and, exemplarily, two guide rollers 8a. The guide rollers 8a are arranged in the rail 2b of FIG. 1 to FIG. 5 for rolling in the rail 2b during the opening sliding movement of the sliding door 4.

As described above, the roller carriage 8 is preferably rigidly attached to the base plate 5a of the sliding arm assembly 5 by means of the attachment unit 5e of FIG. 3 to FIG. 5. This is preferentially accomplished by means of suitable attachment members 8b, such as screws, bolts, rivets and so on. Illustratively, the suitable attachment members 8b attach at least one and, exemplarily, two plate-shaped support elements respectively to the base plate 5a and the roller carriage 8.

According to one aspect, a manually operable activating mechanism 10 is provided for movement of the at least one retaining hook 5d of the sliding arm assembly 5 from the above-described retaining position into a releasing position, e.g. the above-described retracted position, in order to release the at least one retaining hook 5d from the retaining hook counterpart 6c of the dampening unit 6 of FIG. 3 to FIG. 6 prior to sliding the sliding door 4 along the rail 2b of FIG. 1 to FIG. 5 by means of the closing sliding movement into the closing movement direction 4d of FIG. 5 from the fully opened position into the fully closed position. Preferentially, the manually operable activating mechanism 10 is operable independent of a respective mechanism that is operable for locking/unlocking of the sliding door 4. Preferentially, both mechanisms are realized completely separate from each other.

Preferably, the manually operable activating mechanism 10 is equipped with a spring member 10b that is exemplarily embodied by a torsion spring, and a lever unit 10c. The latter is preferentially moveable in associated movement directions that are illustrated by an arrow 10a.

According to one aspect, the spring member 10b loads the at least one retaining hook 5d towards its retaining position as shown in FIG. 5. The lever unit 10c is preferably manually operable by an operator for retracting the at least one retaining hook 5d against the load of the spring member 10b from the retaining position into the retracted position as shown in FIG. 4.

REFERENCE LIST 1 rotary wing aircraft
1a fuselage
1b tail boom
1c tail wing
1d fin
1e tail rotor shroud
1f board side wall
1g starboard side wall
1h side wall aperture
2 sliding door region
2a upper rail arrangement
2b lower rail arrangement
2c sliding door frame
3 sliding door arrangement 4 board side sliding door
4a door leaf
4b door leaf lower edge
4c door opening movement direction
4d door closing movement direction
5 sliding arm assembly
5a sliding arm base plate
5b sliding arm guide finger
5c sliding arm piston pusher
5d sliding arm opening position retaining hook
5e roller carriage attachment unit
6 opening movement dampening unit
6a dampening member
6b dampening member moveable piston
6c dampening unit door retaining counterpart
6d dampening member contact piston movement directions
6e dampening unit mounting flange unit
7a top viewing direction
7b side viewing direction
8 roller carriage
8a guide rollers
8b roller carriage attachment members
9 dampening unit mounting housing
9a fixation members
10 retaining hook activating mechanism
10a retaining hook movement directions
10b torsion spring
10c torsion spring activating lever unit

What is claimed is:

1. A rotary wing aircraft with a fuselage that is equipped with at least one rail, comprising at least one sliding element, in particular a sliding door or a sliding window, that is slidably supported by the at least one rail, wherein the at least one sliding element is at least slidable along the at least one rail by means of an opening sliding movement into an opening movement direction from a fully closed position into a fully opened position,
   wherein a dampening unit is provided that dampens the opening sliding movement of the at least one sliding element upon reaching of the fully opened position, the dampening unit comprising a dampening member with a visco-elastic behavior, the dampening member comprising a moveable piston; and
   wherein at least one sliding arm assembly is mounted to the at least one sliding element for slidably connecting the at least one sliding element to the at least one rail, the at least one sliding arm assembly comprising a piston pusher that pushes the moveable piston upon reaching of the fully opened position of the at least one sliding element against a load that is applied to the moveable piston by means of the dampening member.

2. The rotary wing aircraft of claim 1, wherein the dampening unit is mounted to the fuselage.

3. The rotary wing aircraft of claim 2,
   wherein the dampening unit has a mounting flange that accommodates and retains a dampening member by means of a threaded connection between the mounting flange and the dampening member allowing adjustment along the opening movement direction of the dampening unit.

4. The rotary wing aircraft of claim 2, wherein the dampening unit is accommodated within an associated housing, the housing being releasably mounted to the fuselage by means of associated fixation members.

5. The rotary wing aircraft of claim 1,
   wherein the at least one sliding arm assembly comprises a retaining hook that, upon reaching of the fully opened position of the at least one sliding element, retains the at least one sliding element in the fully opened position such that the load that is applied to the moveable piston by means of the dampening member, which pushes the moveable piston into a closing movement direction of the at least one sliding element, is prevented from pushing the at least one sliding element into the closing movement direction.

6. The rotary wing aircraft of claim 5,
   wherein the retaining hook is movably mounted on the sliding arm assembly, preferably axially moveable, and loaded by means of an associated spring member into a retaining position.

7. The rotary wing aircraft of claim 6,
   wherein the dampening unit comprises a retaining hook counterpart that blocks the retaining hook in its retaining position upon reaching of the fully opened position of the at least one sliding element.

8. The rotary wing aircraft of claim 7,
   wherein a manually operable activating mechanism is provided for movement of the retaining hook from the retaining position into a releasing position in order to release the retaining hook prior to sliding the at least one sliding element along the at least one rail by means of the closing sliding movement into the closing movement direction from the fully opened position into the fully closed position.

9. The rotary wing aircraft of claim 1,
   wherein the dampening member is a mechanical, pneumatical and/or hydraulic damper.

10. The rotary wing aircraft of claim 1,
    wherein the at least one sliding arm assembly comprises a roller carriage.

11. The rotary wing aircraft of claim 10,
    wherein the roller carriage comprises at least one guide roller that is arranged in the at least one rail for rolling in the at least one rail during the opening sliding movement of the at least one sliding element into the opening movement direction.

12. The rotary wing aircraft of claim 11,
    wherein the roller carriage is attached to the at least one sliding arm assembly by means of an associated attachment unit.

13. The rotary wing aircraft of claim 10,
    wherein the at least one sliding arm assembly comprises a guide finger that is arranged in the at least one rail for guiding the at least one sliding element on the at least one rail, at least in case of a failure of the roller carriage.

14. The rotary wing aircraft of claim 1,
    wherein the dampening unit dampens the opening sliding movement of the at least one sliding element starting at most 12 mm prior to reaching of the fully opened position of the at least one sliding element.

15. The rotary wing aircraft of claim 1, wherein the dampening member is configured to exhibit a visco-elastic behavior providing for a smooth damping at low speed and a hard damping at high speed during an associated opening sliding movement upon reaching the fully opened position.

16. A rotary wing aircraft comprising:

a fuselage defining an aperture, and having a rail positioned adjacent to the aperture;

a panel having an arm slidably connecting the panel to the rail such that the panel is moveable in an opening direction from a closed position to an open position; and a visco-elastic damper with a moveable piston connected to the fuselage adjacent to the rail, the damper applying a load to the piston in a closing direction opposite to the opening direction of the panel;

wherein the arm engages and pushes the piston in the opening direction and against the load as the panel reaches the open position such that the damper dampens an opening sliding movement of the panel.

17. The rotary wing aircraft of claim 16 further comprising a mounting flange connecting the damper to the fuselage, the mounting flange forming a threaded aperture therethrough;

wherein the damper is a hydraulic damper or a pneumatic damper, the damper extending through the threaded aperture, the damper having an outer threaded surface cooperating with the threaded aperture of the mounting flange such that a position of the damper is adjustable along the opening direction; and wherein a damping effect of the damper is proportional to a respective speed impact created by the arm on the piston during the opening sliding movement of the panel.

18. The rotary wing aircraft of claim 16 further comprising a first retaining hook slidably supported by the arm, the first retaining hook spring biased towards an extended position, the first retaining hook movable from the extended position to a retracted position via a lever; and a mounting flange connecting the damper to the fuselage, the mounting flange forming a second retaining hook;

wherein the first retaining hook is in the extended position and is engaged with the second retaining hook with the panel in the open position such that the first retaining hook prevents the load applied by the moveable piston onto the arm from pushing the panel in the closing direction.

19. The rotary wing aircraft of claim 18 wherein the second retaining hook is positioned between the damper and a distal end of the moveable piston such that, during movement of the panel in the opening direction, the arm abuts the moveable piston while the first retaining hook is pushed by the second retaining hook into the retracted position.

20. The rotary wing aircraft of claim 18 wherein the first retaining hook is supported by the arm to slide along an axis oriented at an angle relative to the opening direction.

* * * * *